US006298243B1

(12) United States Patent
Basile

(10) Patent No.: US 6,298,243 B1
(45) Date of Patent: Oct. 2, 2001

(54) COMBINED GPS AND CELLULAR BAND MOBILE ANTENNA

(75) Inventor: Philip Charles Basile, Great Falls, VA (US)

(73) Assignee: Geo-Com, Incorporated, Reston, VA (US)

( * ) Notice: Subject to any disclaimer, the term of this patent is extended or adjusted under 35 U.S.C. 154(b) by 0 days.

(21) Appl. No.: 09/229,410

(22) Filed: Jan. 5, 1999

(51) Int. Cl.[7] .......... H04B 1/38
(52) U.S. Cl. .......... 455/552; 455/90
(58) Field of Search .......... 455/12.1, 13.1, 455/90, 269, 347, 351, 426, 427, 456, 550, 552, 553, 575; 343/715, 725, 895

(56) References Cited

U.S. PATENT DOCUMENTS

| | | | | |
|---|---|---|---|---|
| 5,221,929 | * | 6/1993 | Ott | 343/715 |
| 5,650,792 | * | 7/1997 | Moore et al. | 343/725 |
| 5,752,204 | * | 5/1998 | Epperson et al. | 455/575 |
| 5,812,086 | * | 9/1998 | Bertiger et al. | 455/456 |
| 5,918,183 | * | 6/1999 | Janky et al. | 455/550 |
| 5,945,949 | * | 8/1999 | Yun | 455/456 |
| 5,973,568 | * | 10/1999 | Shapiro et al. | 455/103 |
| 6,016,423 | * | 1/2000 | Ross et al. | 455/575 |
| 6,021,330 | * | 2/2000 | Vannucci | 455/456 |
| 6,097,974 | * | 8/2000 | Camp, Jr. et al. | 455/575 |
| 6,122,506 | * | 9/2000 | Lau et al. | 455/427 |
| 6,128,508 | * | 10/2000 | Francisco et al. | 455/552 |
| 6,148,196 | * | 11/2000 | Baumann | 455/427 |

* cited by examiner

*Primary Examiner*—Nay Maung
*Assistant Examiner*—Quochien B. Vuong

(74) *Attorney, Agent, or Firm*—Mayer Fortkort & Williams, PC; Michael P. Fortkort, Es

(57) ABSTRACT

A combined cellular and GPS antenna resembles a magnetic mount cellular antenna, but provides both cellular transmit/receive functions as well as GPS reception. Furthermore, the present invention provides a combined GPS antenna operating at 1540 MHZ with a cellular antenna in the 800 to 950 MHZ range and provides extended elevation coverage for the cellular band. The dual purpose antenna structure of the present invention can be used with any cellular radio which incorporates GPS as an internal locating function. A single coaxial cable between the radio and the antenna can carry the GPS reception signal, the cellular receive and transmit traffic, as well as DC power required by the sensitive GPS amplifiers, located in the antenna itself. The dual antenna structure consists of a ¾ wave monopole antenna for transmitting and receiving cellular signals, a patch antenna for receiving GPS signals and a diplexer to direct the cellular signals to be transmitted to the cellular antenna from the coaxial cable and to direct the GPS and cellular signals received from the respective antennas, respectively, to the single coaxial cable. The cellular RF and GPS receive signals are transported simultaneously over a common cable. Bi-directional cellular radio signals are separated from the coaxial cable by a diplexer. The diplexer consists of two bandpass filters, which combine the GPS and the cellular traffic for transmission over the coaxial cable. The cellular radio contains a similar item and is used to separate the signals to the respective receiver segments. The diplexer delivers the transmit signal only to the cellular antenna and prevents the high power transmit signal from damaging sensitive GPS components in the GPS assembly. A passive inductive/capacitive network provides a conjugate impedance match to the antenna structure for maximum effective radio range.

20 Claims, 7 Drawing Sheets

COMBINED GPS AND CELLULAR BAND MOBILE ANTENNA

BACKGROUND OF THE INVENTION

The present invention relates generally to cellular antennas and more particularly to a cellular antenna for receiving global positioning satellite signals in addition to transmitting and receiving cellular signals.

The increased utilization of the Global Positioning Satellite (GPS) system for non-military applications has created a significant market targeted at the average consumer. The GPS system can relay position, speed and height with high precision and accuracy to a user. One such application is the ability to relay both to a mobile user and to a base station the user's position during a call from a personal cellular telephone.

The frequency allocation for GPS is approximately 1540 MHZ. The frequency allocation for the Advanced Mobile Phone System (AMPS) is approximately 824–890 MHZ, and approximately 900–950 MHZ for the Global System for Mobile Communications (GSM). The differences in the frequencies of almost an octave and the fact that the cellular system communicates terrestrially, while the GPS system communicates via satellite, mandates that the antenna designs be completely different. The use of the two individual antennas is cosmetically un-attractive and requires almost double the installation effort in respect to mounting and cable routing.

A second problem exists with conventional cellular ¼ wave whip type antennas. Conventional cellular antennas aim their signal from zero to thirty degrees above the horizon. Communications is often lost in mountainous areas, where reception is required at elevation angles above thirty degrees.

The present invention is therefore directed to the problem of developing a combined cellular and GPS antenna while enabling reception at higher elevation angles than conventional cellular antennas.

SUMMARY OF THE INVENTION

The present invention solves this problem by providing a combined cellular and GPS antenna that resembles a magnetic mount cellular antenna, but provides both cellular transmit/receive functions as well as GPS reception. Furthermore, the present invention provides a combined GPS antenna operating at 1540 MHIZ with a cellular antenna in the 800 to 950 MHZ range and provides extended elevation coverage for the cellular band.

According to the present invention, one exemplary embodiment of an apparatus for receiving global positioning satellite system signals and transmitting and receiving cellular signals includes a global positioning satellite system antenna, a cellular antenna and a common enclosure. The global positioning satellite system antenna receives the global positioning satellite system signals. The cellular antenna receives and transmits the cellular signals. The common enclosure houses both the global positioning satellite system antenna and the cellular antenna.

According to the present invention, a particularly advantageous embodiment of the above apparatus employs a patch antenna as the global positioning satellite system antenna. One exemplary embodiment of the patch antenna is approximately 25 mm by 25 mm square, which patch antenna has a classical antenna pattern and provides coverage from approximately 30 degrees to 90 degrees in elevation at all azimuth angles. One exemplary embodiment of the cellular antenna is a ¾ wave monopole antenna.

According to the present invention, another exemplary embodiment of an apparatus for receiving global positioning satellite system signals and transmitting and receiving cellular signals includes a global positioning satellite system antenna, a cellular antenna, a diplexer, and a radome. The global positioning satellite system antenna receives the global positioning satellite system signals. The cellular antenna receives and transmits the cellular signals. The diplexer couples to a cellular radio, directs cellular signals to the cellular antenna and directs global positioning satellite system signals to the global positioning satellite system antenna. The radome houses both the global positioning satellite system antenna and the cellular antenna.

One particularly advantageous embodiment of the above apparatus includes a low noise amplifier coupled to the diplexer and the global positioning satellite system antenna.

Another particularly advantageous embodiment of the above apparatus includes a matching network coupled to the diplexer and the cellular antenna.

Yet another particularly advantageous embodiment of the above apparatus includes a magnetic base on which the diplexer, matching network, and radome are mounted.

One particularly advantageous embodiment of the diplexer in the above apparatus is two bandpass filters, which combine received global positioning satellite system signals and received cellular signals for transmission to the cellular radio. Moreover, the diplexer couples cellular signals to be transmitted only to the cellular antenna.

One particularly advantageous embodiment of the matching network in the above apparatus is a passive inductive/capacitive network, which provides a conjugative impedance match to the global positioning satellite system antenna.

One particularly advantageous embodiment of the cellular antenna in the above apparatus is a cellular monopole antenna. In this case, the cellular monopole antenna includes an approximately 0.062 diameter spring steel wire between approximately 9–10 inches in length.

According to the present invention, an exemplary embodiment of a method for receiving and transmitting cellular signals and receiving signals from a global positioning system, includes the steps of: a) providing a common housing for a global positioning satellite system antenna receiving the global positioning satellite system signals and a cellular antenna receiving and transmitting the cellular signals; b) directing received cellular signals to a cellular receiver; c) directing cellular signals to be transmitted to a cellular antenna; and d) directing received global positioning system signals to a global positioning system receiver.

Furthermore, the above method can also include the step of coupling a low noise amplifier to a diplexer directing the cellular and global positioning signals and a global positioning satellite system antenna. In addition, the above method can include the steps of: matching the impedance of the diplexer and the cellular antenna; mounting the common housing on a magnetic base; or mounting the diplexer and a matching network on the magnetic base.

According to the present invention, a device for receiving and transmitting cellular signals and receiving signals from a global positioning system, includes a cellular antenna receiving and transmitting the cellular signal, a global positioning satellite system antenna receiving the global positioning satellite system signal, and a means for housing the global positioning satellite system antenna and the cellular antenna. The device further includes first means for directing received cellular signals to a cellular receiver, second means for directing cellular signals to be transmitted to the cellular antenna, and third means for directing received global positioning system signals to a global positioning system receiver and for preventing cellular signals from reaching the global positioning satellite system antenna. In addition, the device can include a low noise amplifier coupled to the third means for directing and the global positioning satellite system antenna, a matching network matching the impedance of first, and second for directing and the cellular antenna, or a magnetic base on which the means for housing, the first, second and third means for directing and the matching network is mounted.

DETAILED DESCRIPTION

There are several advantages to the present invention. The first advantage is that two completely different antenna structures are housed in a single unit, which provides the appearance of a standard magnetic mount antenna. One antenna is designated for GPS reception and the second antenna is designated for operating the appropriate cellular band. The second advantage is that the present invention increases the communications coverage of the cellular antenna in elevation beyond 60 degrees from the conventional 30 degrees for rough terrain reception. This is most effective when cellular towers are located on mountain tops or reception is achieved via knife edge diffraction.

The dual purpose antenna structure of the present invention can be used with any cellular radio which incorporates GPS as an internal locating function, such as the new 911 emergency calling standards. A single coaxial cable between the radio and the antenna can carry the GPS reception signal, the cellular receive and transmit traffic, as well as DC power required by the sensitive GPS amplifiers, located in the antenna itself.

Figure 1:
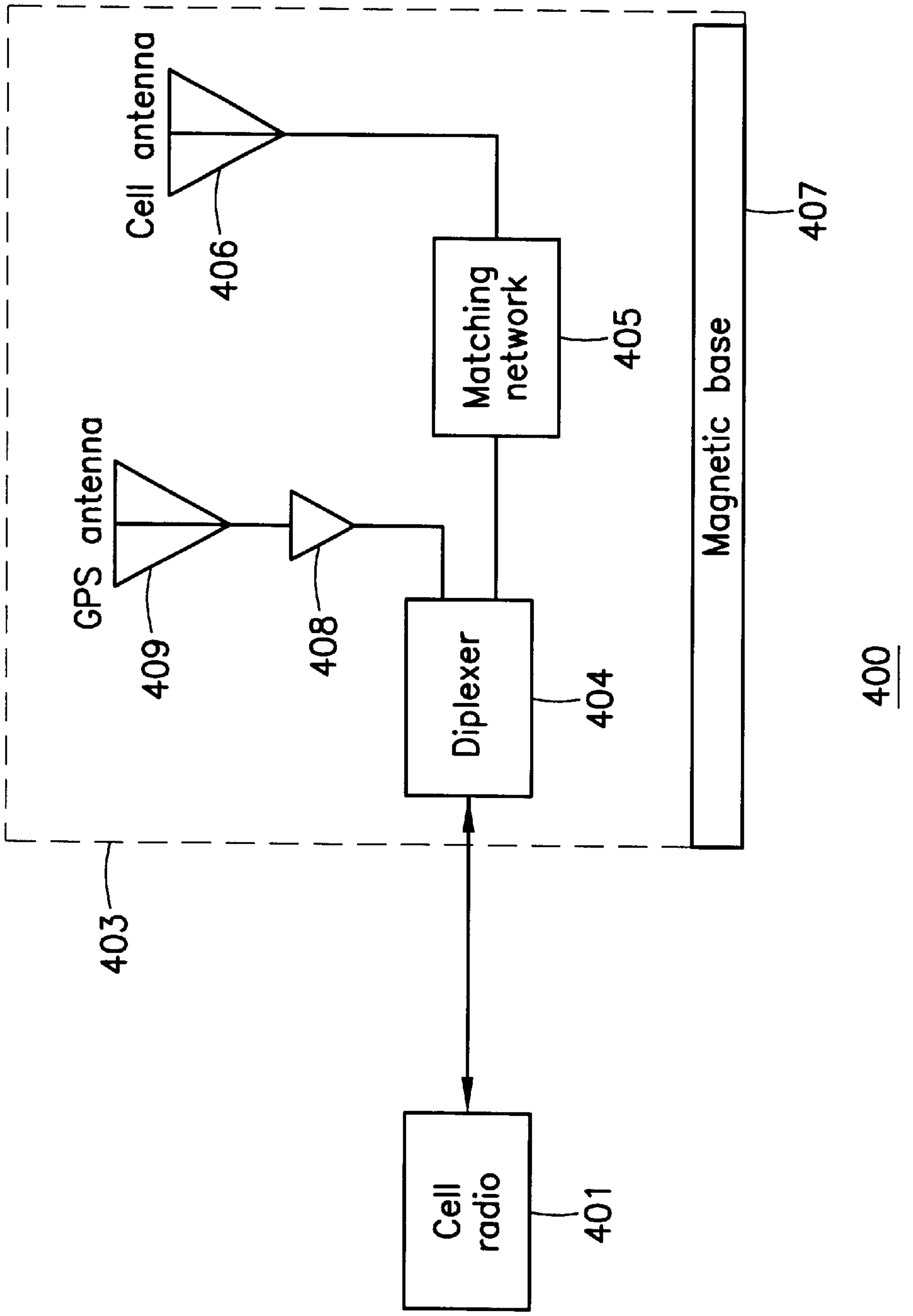
FIG. 1 depicts in block diagram format an exemplary embodiment of the combined cellular and GPS antenna of the present invention.

Referring to FIG. 1, shown therein in block diagram format is an exemplary embodiment of the present invention. All items within the dotted line represent one exemplary embodiment 400 of the combined GPS and cellular antenna of the present invention.

The dual antenna structure 400 consists of a ¾ wave monopole antenna 406 for transmitting and receiving cellular signals, a patch antenna 409 for receiving GPS signals and a diplexer 404 to direct the cellular signals to be transmitted to the cellular antenna 406 from the coaxial cable 402 and to direct the GPS and cellular signals received from the respective antennas 409, 406, respectively, to the single coaxial cable 402.

The cellular radio 401 is a standard cellular radio. The cellular radio 401 has the ability to receive and transmit cellular traffic and requires all of the elements within 407 to function properly. Furthermore, cellular radio 401 includes a GPS receiver (not shown) in addition to the standard cellular transmitter (not shown).

Coupling the cellular radio 401 to the antenna system 400 of the present invention is a common low loss coaxial cable 402 with a nominal impedance of 50 ohms. The cellular RF and GPS receive signals are transported simultaneously over cable 402. Cable 402 also provides DC power for the GPS low noise amplifier (408), which is located within the GPS assembly.

Bi-directional cellular radio signals are separated from the coaxial cable 402 by diplexer 404. Diplexer 404 consists of two bandpass filters, which combine the GPS and the cellular traffic for transmission over the coaxial cable 402. Cellular radio 401 contains a similar item and is used to separate the signals to the respective receiver segments (not shown). Diplexer 404 delivers the transmit signal only to the cellular antenna 406 and prevents the high power transmit signal from damaging sensitive GPS components in the GPS assembly.

A passive inductive/capacitive network 405 provides a conjugate impedance match to the antenna structure 406 for maximum effective radio range.

The cellular monopole antenna structure 406 consists of a 0.062 inch diameter spring steel wire approximately 10 inches long for the AMPS frequency band and 9.5 inches for the GSM band. It maintains a ¾ lambda electrical length over most of the band.

Figure 2:
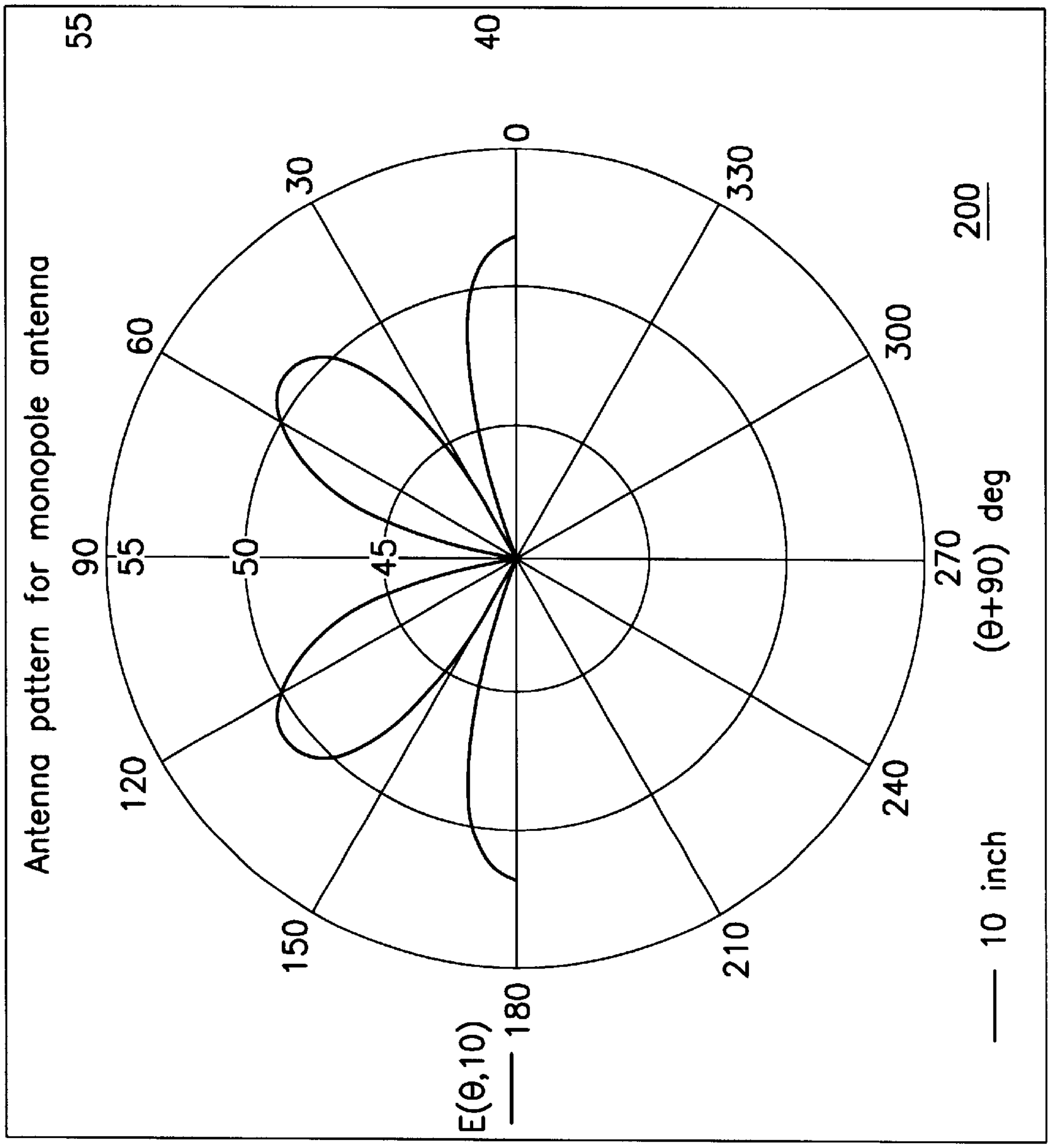
FIG. 2 depicts the resulting antenna pattern of an exemplary embodiment of the combined cellular and GPS antenna of the present invention, which shows elevation electrical gain performance from horizon to horizon.

The resulting antenna pattern 200 for the cellular antenna 406 is depicted in FIG. 2. The antenna pattern 200 shown in FIG. 2 shows elevation electrical gain performance from horizon to horizon (0, 180). The radial circles are in 5 dB increments with the outer most line at approximately 5 dB gain absolute. The antenna 406 provides ample gain for both terrestrial and elevated look angles.

Figure 3C:
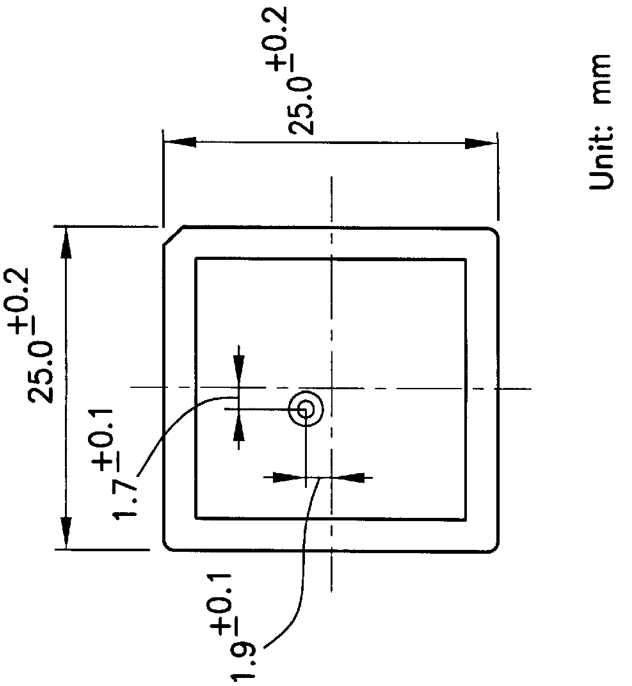
FIGS. 3A–C depict one exemplary embodiment of a patch antenna for use in the present invention in various views.
Figure 3B:
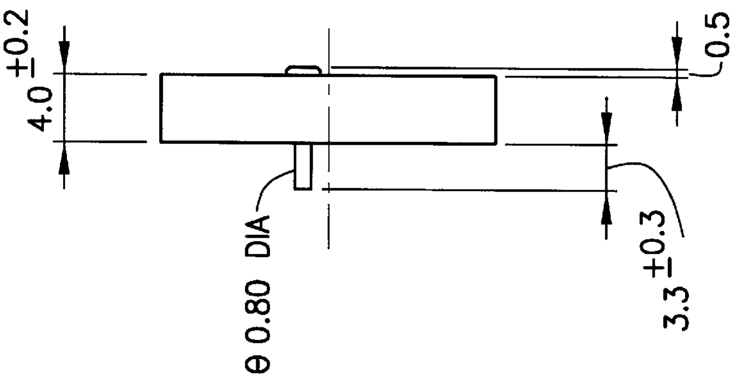
Figure 3A:
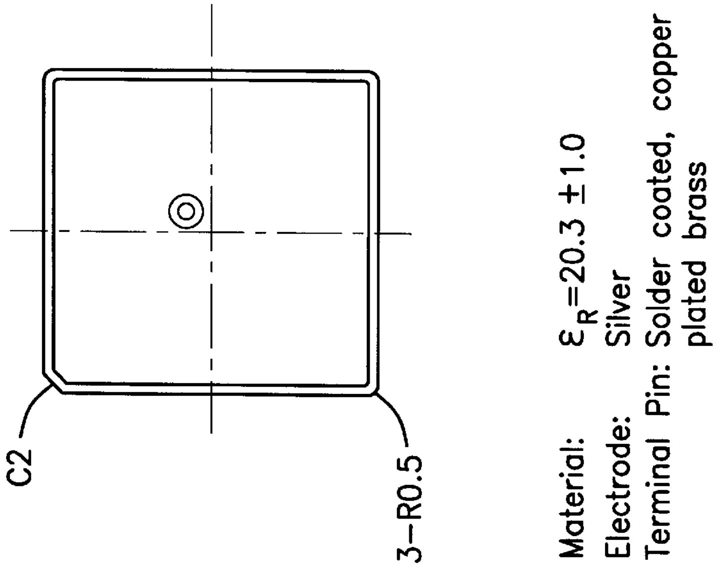

Referring to FIGS. 3A–C, patch antenna 409 is approximately 25 mm per side. The patch antenna 409 has a centrally located electrode 301 made of silver. The terminal pin is solder coated, copper plated brass. The material has a $\epsilon_R$ of 20.3±1.0.

Referring to FIG. 3B, the patch antenna 409 is 4.0 mm thick. The electrode 301 juts out of the patch antenna about 3.3 mm. The terminal pin juts out of the bottom of the patch antenna 409 by about 0.5 mm max.

FIG. 3C shows the location of the electrode, which is off center by about 1.9 and 1.7 mm.

Figure 4A:
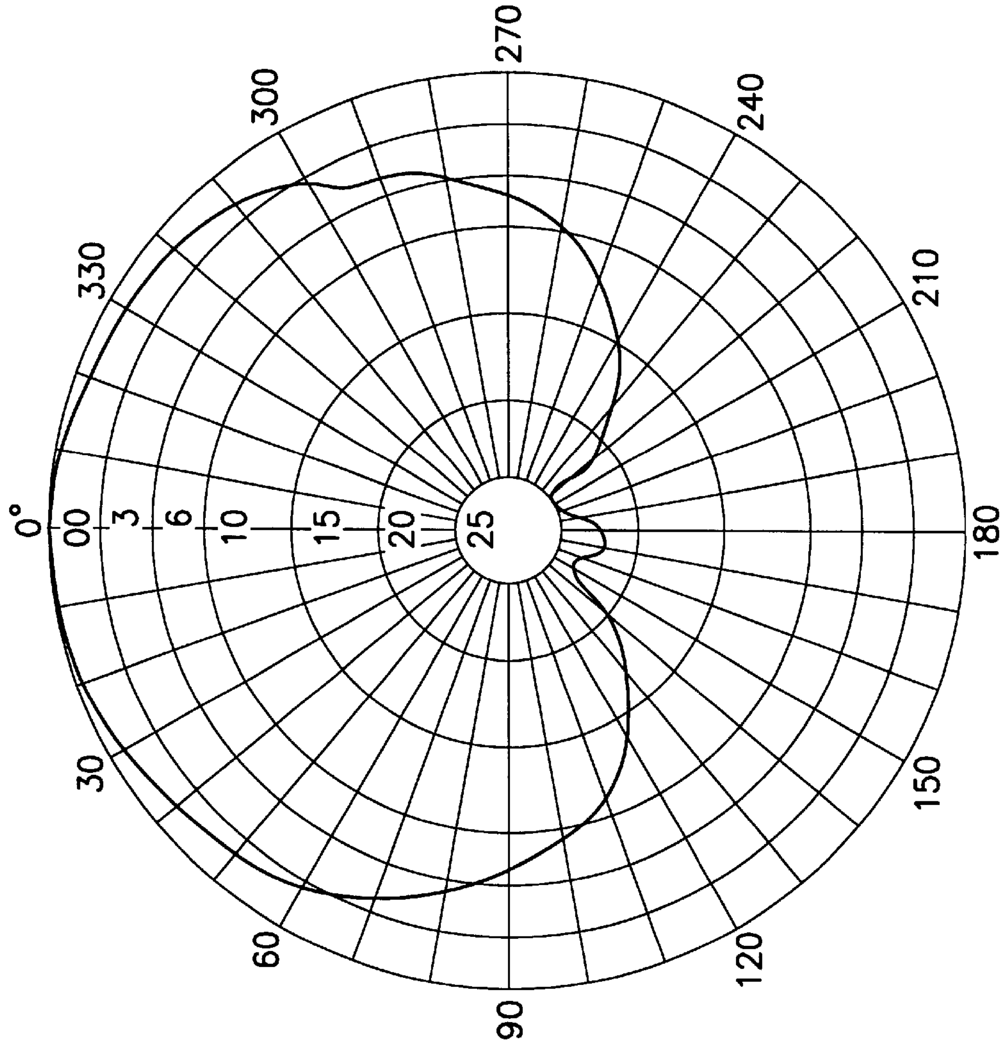
FIGS. 4A–B depict an antenna pattern of the patch antenna depicted in FIGS. 3A–C.
Figure 4B:
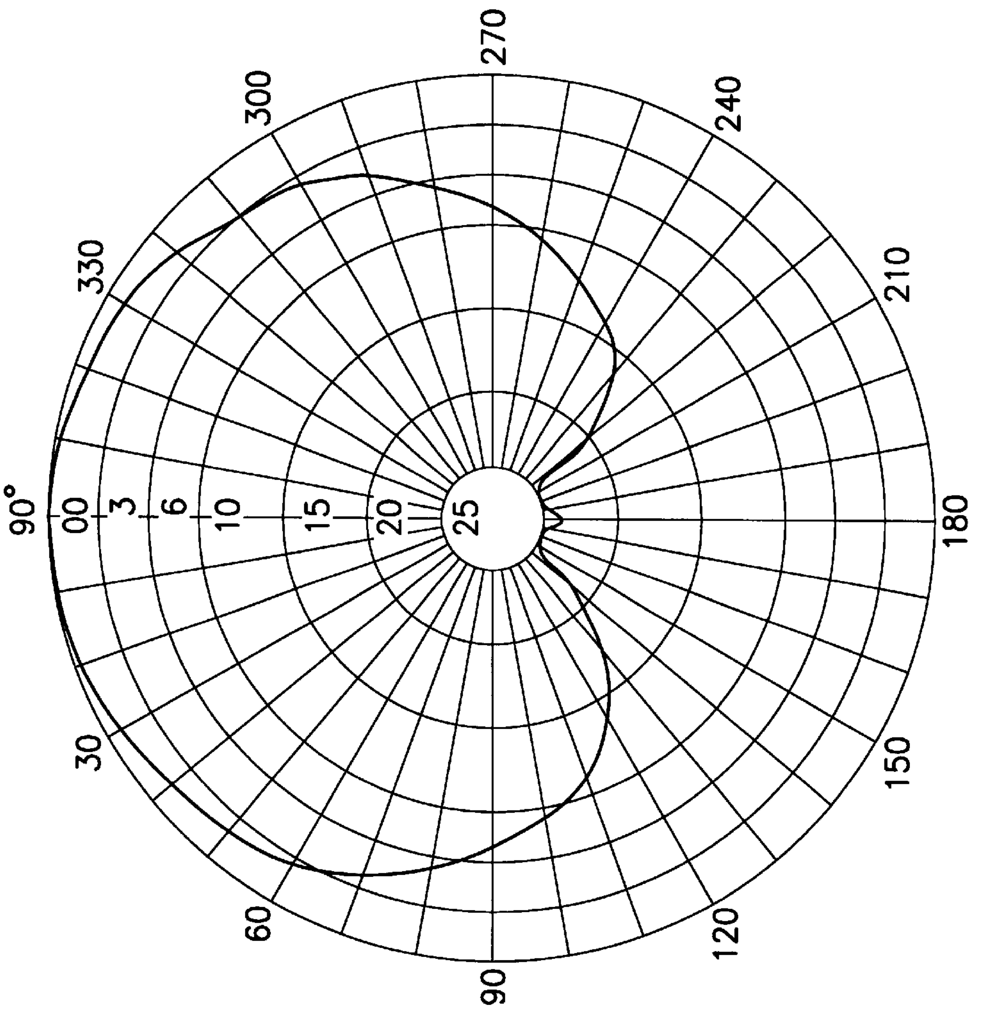

FIGS. 4A–B depict the antenna pattern of patch antenna 409. The pattern is classical and provides coverage from approximately thirty degrees to ninety degrees in elevation at all azimuth angles. This type of antenna design is ideal for overhead satellite coverage, such as GPS.

Low noise amplifier 408 has an approximate 1 dB noise figure and is employed to preserve the signal to noise ratio achieved by the GPS antenna when transporting high frequency signals over long lengths of coaxial cable to the receiver. The magnetic base 407 is equal in diameter to the GPS assembly and forms the antenna base.

Figure 5:
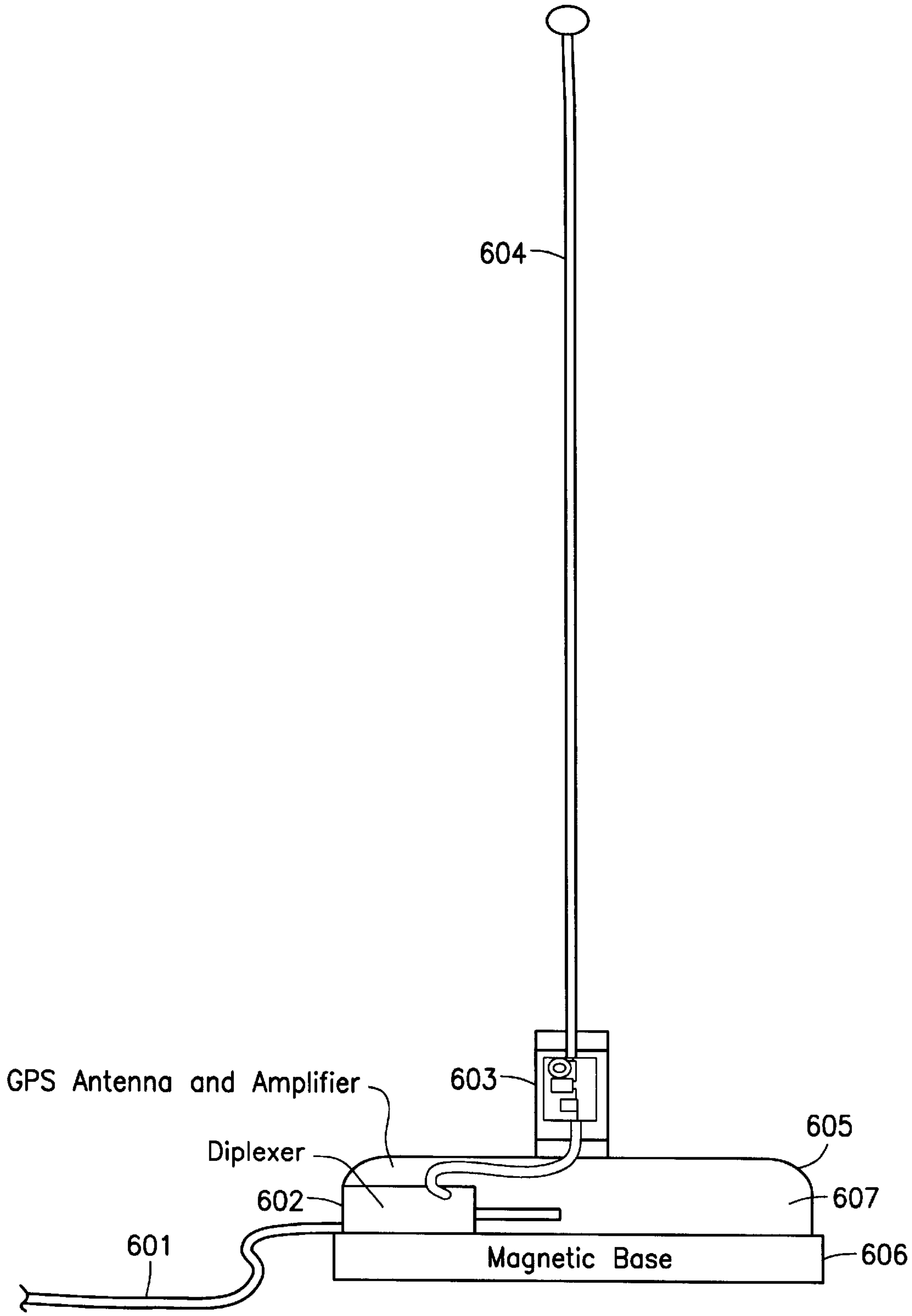
FIG. 5 depicts the detailed antenna assembly of an exemplary embodiment of the combined cellular and GPS antenna of the present invention.

The detailed antenna assembly is depicted in FIG. 5. Magnetic base 606 is secured to the GPS antenna assembly 605 by screw type mounting hardware. The magnetic base 606 and the GPS assembly 605 have identical diameters, and appear as a single base unit for cosmetic effects.

The GPS antenna assembly 605 is housed in a plastic low loss RF radome 607 and contains the diplexer 602, amplifier 408 and the patch antenna 409. The patch antenna 409 is centrally located in the radome 607, in order to be minimally shadowed by the cellular antenna matching unit 603 and the cellular antenna 604.

The matching unit 603 is tubular in design and is mounted to the radome 607 at its center. The diameter of the matching unit housing is much smaller than the dimensions of the patch antenna 409 in order to provide maximum antenna gain from the patch antenna 409 and thus provides reliable GPS communications without shadowing.

Figure 6:
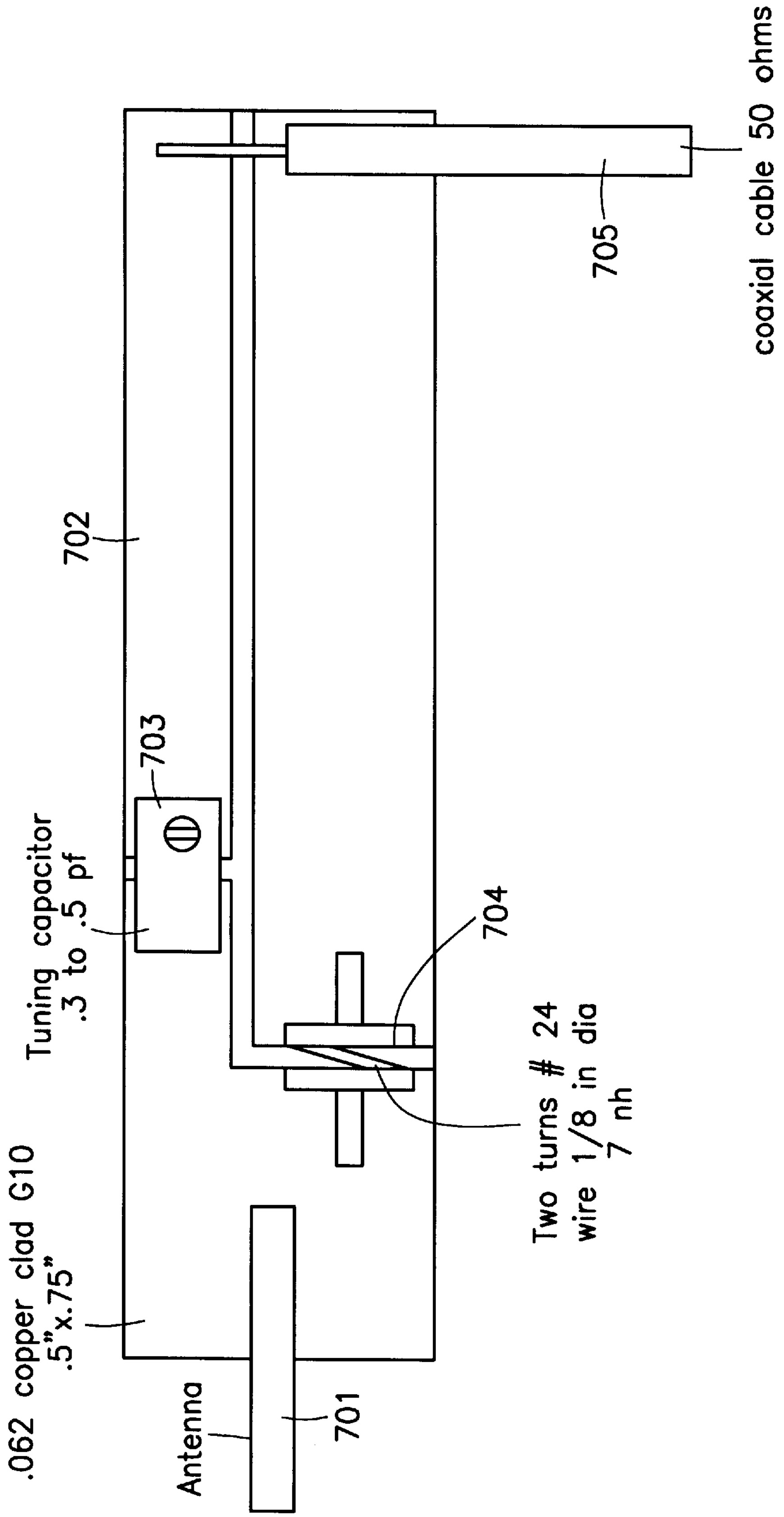
FIG. 6 depicts one exemplary embodiment of the matching circuitry inside the cellular matching unit used in an exemplary embodiment of the present invention.

The matching circuitry inside the cellular matching unit 603 is depicted in FIG. 6. The antenna rod 604 is mounted to the matching circuitry housing via a 0.062 inch diameter hole centered in the cellular antenna matching unit 603. The antenna is bonded to the housing and is electrically connected to the circuit board.

The matching network 603 consists of a coil 704 and capacitor 703 to provide a conjugate match of the antenna to 50 ohms. The cellular receive port of the diplexer is connected to the printed circuit board 702 via coaxial cable 705. Coaxial cable 705 is a small length of coaxial cable, such as RG-316. The characteristic impedance is 50 ohms at this location. The variable capacitor 703 provides a series match element to the antenna 701. Inductor 704 provides a shunt match element for the antenna 701. Both are required to provide the conjugate match. Variable capacitor 703 is tunable to provide precise matching to better than 1.25:1 Voltage Standing Wave Ratio (VSWR). The antenna 701 is mounted to the copper area of the printed circuit board 702 via solder or a mechanical device. The entire assembly is located in the housing of matching unit 603. The key to the match network design is that the printed circuit board in the matching unit is thin and presents only a small cross sectional area which negligibly blocks the satellite signals from the patch antenna. This allows the cellular antenna and the GPS antenna to co-exist in very close proximity.

Patch Antenna

One example of a patch antenna for use in the present invention is the DAK1575MS50 patch antenna manufactured by Toko. This patch antenna has an outline of 25 mm, and a ground plane of 70×70 mm. The patch antenna is a miniature dielectric antenna element for GPS systems. It has excellent stability and sensitivity through the use of high performance ceramic materials well suited for GPS frequencies. The center frequency of the patch antenna is 1580.5 MHZ, which is downshifted by 5 MHZ when covered with a radome. The bandwidth is 9 MHZ. The antenna has an impedance of 50 Ω.

The patch antenna is flat and has a rectangular micro-strip antenna design and uses GPS right hand circular polarization wave reception and offset one point feeding through ground plane method. The antenna is 25mm square in size. The patch antenna is one quarter the size of traditional antenna elements without loss of sensitivity. Moreover, the patch antenna has excellent temperature stability via use of low temperature coefficient dielectric ceramics. The silver plated electrode allows very good high frequency characteristics.

The above patch antenna is depicted in FIGS. 3A–C. FIG. 3A depicts a top view of the antenna, FIG. 3B depicts a side view, and FIG. 3C depicts a bottom view.

What is claimed is:

1. An apparatus for receiving global positioning satellite system signals and transmitting and receiving cellular signals, comprising:

a) a global positioning satellite system antenna receiving the global positioning satellite system signals;

b) a cellular antenna receiving and transmitting the cellular signals;

c) a matching network coupled to the cellular antenna; and d) a common enclosure housing the global positioning satellite system antenna, the cellular antenna and the matching network, said global positioning satellite system antenna, said matching network and said cellular antenna being aligned along a same axis.

2. The apparatus according to claim 1, wherein the global positioning satellite system antenna comprises a patch antenna.

3. The apparatus according to claim 2, wherein the patch antenna is approximately 25 mm by 25 mm square.

4. The apparatus according to claim 3, wherein the patch antenna has a classical antenna pattern and provides coverage from approximately 30 degrees to 90 degrees in elevation at all azimuth angles.

5. The apparatus according to claim 1, wherein the cellular antenna comprises a ¾ wave monopole antenna.

6. The apparatus according to claim 1, wherein the diameter of said matching network is smaller than the diameter of said global positioning satellite system antenna.

7. An apparatus for receiving global positioning satellite system signals and transmitting and receiving cellular signals, comprising:

a) a global positioning satellite system antenna receiving the global positioning satellite system signals;

b) a cellular antenna receiving and transmitting the cellular signals; and c) a diplexer for coupling to a cellular radio and directing cellular signals to the cellular antenna and directing global positioning satellite system signals to the global positioning satellite system antenna;

d) a matching network being coupled to the diplexer and the cellular antenna; and e) a radome housing the global positioning satellite system antenna, the cellular antenna and the matching network, said global positioning satellite system antenna, said matching network and said cellular antenna being aligned along a same axis.

8. The apparatus according to claim 7, further comprising a low noise amplifier being coupled to the diplexer and the global positioning satellite system antenna.

9. The apparatus according to claim 7, further comprising a magnetic base on which the diplexer, matching network, and radome are mounted.

10. The apparatus according to claim 7, wherein the diplexer includes two bandpass filters combining received global positioning satellite system signals and received cellular signals for transmission to the cellular radio.

11. The apparatus according to claim 7, wherein the diplexer couples cellular signals to be transmitted only to the cellular antenna.

12. The apparatus according to claim 7, wherein the matching network comprises a passive inductive/capacitive network providing a conjugative impedance match to the cellular antenna.

13. The apparatus according to claim 7, wherein the cellular antenna comprises a cellular monopole antenna.

14. The apparatus according to claim 13, wherein the cellular monopole antenna includes an approximately 0.062 diameter spring steel wire between approximately 9–10 inches in length.

15. A method for receiving and transmitting cellular signals and receiving signals from a global positioning system, comprising the steps of:

a) providing a common housing for a global positioning satellite system antenna receiving the global positioning satellite system signals, a cellular antenna receiving and transmitting the cellular signals and a matching network coupled to the cellular antenna for matching the impedance of the diplexer and the cellular antenna;

b) aligning said global positioning satellite system antenna, said matching network and said cellular antenna along a same axis;

c) directing received cellular signals to a cellular receiver;

d) directing cellular signals to be transmitted to a cellular antenna;

e) directing received global positioning system signals to a global positioning system receiver.

16. The method according to claim 15, further comprising the step of coupling a low noise amplifier to a diplexer directing the cellular and global positioning signals and a global positioning satellite system antenna.

17. The method according to claim 16, further comprising the step of mounting the common housing on a magnetic base.

18. The method according to claim 17, further comprising the step of mounting the diplexer and a matching network on the magnetic base.

19. A device for receiving and transmitting cellular signals and receiving signals from a global positioning system, comprising:

a) a cellular antenna receiving and transmitting the cellular signals;

b) a global positioning satellite system antenna receiving the global positioning satellite system signals;

c) means for housing the global positioning satellite system antenna and the cellular antenna;

d) first means for directing received cellular signals to a cellular receiver;

e) second means for directing cellular signals to be transmitted to the cellular antenna; and f) third means for directing received global positioning system signals to a global positioning system receiver and for preventing cellular signals from reaching the global positioning satellite system antenna, said global positioning satellite system antenna and said cellular antenna being aligned along a same axis.

20. The device according to claim 19, further comprising:

a) a low noise amplifier being coupled to the third means for directing and the global positioning satellite system antenna;

b) a matching network matching the impedance of first and second means for directing and the cellular antenna; and c) a magnetic base on which the means for housing, the first, second and third means for directing and the matching network is mounted, said matching network being aligned along a same axis said global positioning satellite system antenna and said cellular antenna.

* * * * *

UNITED STATES PATENT AND TRADEMARK OFFICE

CERTIFICATE OF CORRECTION

PATENT NO. : 6,298,243 B1
DATED : October 2, 2001
INVENTOR(S) : Philip Charles Basile It is certified that error appears in the above-identified patent and that said Letters Patent is hereby corrected as shown below:

Column 4,
Line 7, after "within", insert -- magnetic base --.

Claim 20,
Line 32, after "axis", insert -- as --.

Signed and Sealed this

Nineteenth Day of March, 2002

*Attest:*

JAMES E. ROGAN
*Director of the United States Patent and Trademark Office*

*Attesting Officer*